INVENTOR.
Shin-Ichi Kawada

Aug. 19, 1969  SHIN-ICHI KAWADA  3,461,568
GYROCOMPASS

Original Filed June 18, 1964  3 Sheets-Sheet 3

INVENTOR.
Shin-Ichi Kawada

BY *Hill, Sherman, Meroni, Gross & Simpson*  ATTORNEYS

United States Patent Office 3,461,568
Patented Aug. 19, 1969

3,461,568
GYROCOMPASS
Shin-ichi Kawada, Yokohama-shi, Japan, assignor to Kabushikikaisha Tokyo Keiki Seizosho (Tokyo Keiki Seizosho Co., Ltd.), Tokyo, Japan
Original application June 18, 1964, Ser. No. 376,020, now Patent No. 3,321,841, dated May 30, 1967. Divided and this application Mar. 30, 1967, Ser. No. 627,062
Claims priority, application Japan, June 19, 1963, 38/32,220
Int. Cl. G01c 19/38, 19/40
U.S. Cl. 33—226                              4 Claims

ABSTRACT OF THE DISCLOSURE

A gyrocompass having an integral torque generator rotatably mounted on a conventional gyro in accordance with movement of the gyro, said integral torque generator including a cylindrical vessel and a particle movably positioned within said cylindrical vessel so as to produce a torque with respect to time for eliminating errors such, for example, as a latitudinal error caused by the earth rotation and an error caused by mass unbalance of a gyro about the horizontal axis thereof according to change of temperature and/or the like.

---

This application is a division of my application Ser. No. 376,020, filed June 18, 1964, now Patent No. 3,321,-841.

BACKGROUND OF THE INVENTION

Field of the invention

The present invention relates to a gyrocompass having an element for eliminating errors such, for example, as a latitudinal error caused by the earth rotation and an error caused by mass unbalance of a gyro about the horizontal axis thereof according to change of temperature and/or the like.

Description of the prior art

A conventional gyrocompass has defects, for example, a latitudinal error caused by the earth rotation and an error caused by mass unbalance of a gyro about the horizontal axis thereof according to change of temperature and/or the like. Accordingly, there inevitably occur an error in north-seeking action of the conventional gyrocompass in accordance with the latitudinal error and the like.

SUMMARY OF THE INVENTION

The present invention relates to a gyrocompass including an integral torque generator in addition to conventional gyrocompass elements. According to the operation of the integral torque generator of the present invention defects such, for example, as a latitudinal error caused by the earth rotation and an error caused by mass unbalance of a gyro about the horizontal axis thereof can be substantially eliminated.

DESCRIPTION OF THE PREFERRED EMBODIMENTS

Before entering into the explanation of the present invention in detail, a conventional type gyrocompass will hereinbelow be explained simply which is provided with a mercury ballistic or a liquid ballistic (hereinafter referred to as a ballistic) and a device which applies a torque about a vertical axis of the gyrocompass in proportion to gyro inclination.

In all the conventional type gyrocompass, their gyro-spin axes are not correctly horizontal with respect to the surface of the earth when the gyrocompasses set still pointing substantially to the north, and in Northern Hemisphere their north-side ends of the spin axes are a little higher than the south-side ones. In the conventional type compass provided with the ballistic, the liquid of the ballistic flows to a pot of the south side which is lower than the north side and accordingly the south side becomes a little heavier than the north side, thereby producing a torque around a horizontal axis crossing the spin axis of the gyro at the right angle. With this torque, the gyro causes a precession around the vertical axis thereof. The angular velocity of the precession coincides with an angular velocity around the vertical axis of the surface of the earth at that place and the surface of the earth and the gyro rotate together, so that the gyro is regarded to stand still, pointing substantially to the north, with respect to the surface of the earth. That is, in the conventional type gyrocompass the inclination of the gyro spin axis from the horizontal level differs in accordance with the location of the gyrocompass and this inclination depends upon only the latitude of the location, and the spin axis is horizontal at the Equator and the south side thereof becomes higher than the north side, for example, in the Southern Hemisphere.

As a damping system for making a gyro stationary toward the north, there is employed a method to apply a torque about a vertical axis of a gyro in proportion to gyro inclination. According to this method, however, the position that the gyro inclines becomes a stationary point except at the Equator, and hence a damping torque produced about the vertical axis remain at the stationary point. As a result of this, the gyro axis does not point to the due north, producing an error. This error is related only to the latitude in its nature, more correctly, it is proportional to the tangent of latitude and it has long been referred to as a latitudinal error.

Figure 1:
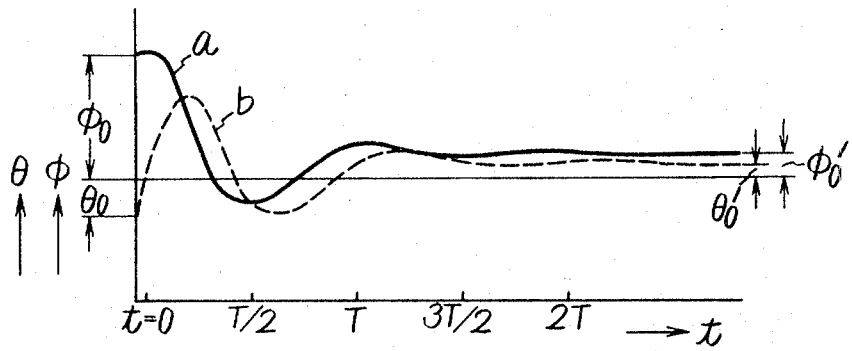
FIGURE 1 is a graph for explaining the north-seeking action of a gyrocompass heretofore employed.

If now a conventional gyrocompass is started from a position that its gyro spin axis tilts toward the east by an angle $\phi_0$ from the north and its north side lies lower an angle $\theta_0$ than the south side, the spin axis performs damped oscillation as shown by the azimuthal curves $a$ and $b$ in FIGURE 1 due to the action of a ballistic and a damping device and then comes to a standstill at a position that the north side of the axis is higher than the south side by $\theta_0'$, producing an error (a latitudinal error) of $\phi_0'$ in azimuth. In FIGURE 1, the abscissa expresses time $t$ in unit time $T$ and the ordinate expresses an azimuth $\phi$ (the east) and an angle of inclination $\theta$ (the north).

In this kind of gyrocompasses, errors are produced even by transfer of the center of gravity which is caused due to temperature rise of the gyro and the like and with the lapse of time. This is because of the fact that when the gyrocompass comes to a standstill toward the north, precession around its vertical axis coincides with the rotary component around the vertical axis of the earth at a place where the gyrocompass is located for the reasons described above and a torque must be produced from a ballistic for eliminating a torque around the horizontal axis of the gyrocompass and, as a result of this, gyro-inclination becomes different at the stationary point. For the same reasons, all the inherent torque produced the horizontal axis cause constant errors.

In view of the foregoing disadvantages, the present invention is to provide means for obtaining highly efficient gyrocmpasses without accompanying the errors.

Figure 2:
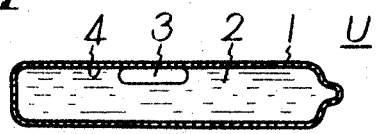
FIGURE 2 is a schematic diagram illustrating an example of an integral torque generator which may be used in the present invention.

In FIGURE 2, an integral torque generator is generally indicated at a reference U which is an example of an element of this invention. In this example the integral torque generator U is such that a highly viscous liquid 2 is enclosed in a cylindrical sealed vessel 1 and a bubble 3 is formed therein. That is, this integral torque generator is similar to a usual bubble-type level. However, a difference therebetween resides in that the inner surface 4 of te vessel 1 with which the bubble 3 gets in touch is not curved but straight in the present example. The inner surface of a vessel of the usual level is curved. In other words, the inner surface 4 of this example is exactly cylindrical. Therefore, when the inner surface 4 is horizontal the bubble 3 can rest at any position and when the surface 4 is inclined the bubble 3 always moves on toward a higher end of the vessel 1 and it cannot rest on the way. A second difference between the present invention and the usual level is that the liquid 2 is of relatively high viscosity, and accordingly moving speed of the bubble 3 is exactly proportionate to the inclination of the cylindrical surface 4. That is, the position of the bubble 3 of this example shown in FIGURE 2 is in proportion to an integrated value of the inclination of the surface 4 with respect to time. At the same time, the position of the center of gravity varies proportionally in response to travel of the bubble 3, so that this also is proportionate to the integrated value of the inclination of the surface 4.

Figure 3:
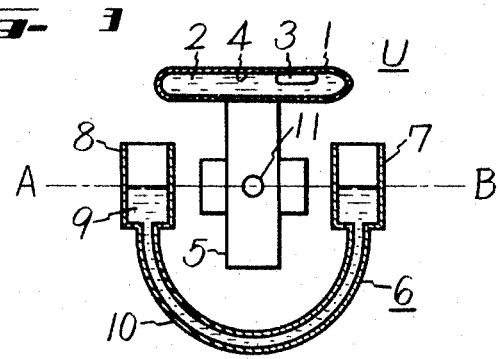
FIGURE 3 is a diagram fundamentally illustrating an embodiment of the present invention.

With reference to FIGURE 3, the principle of the present invention will hereinbelow be explained that the aforementioned integral torque generator U is applied to a gyrocompass.

Figure 4:
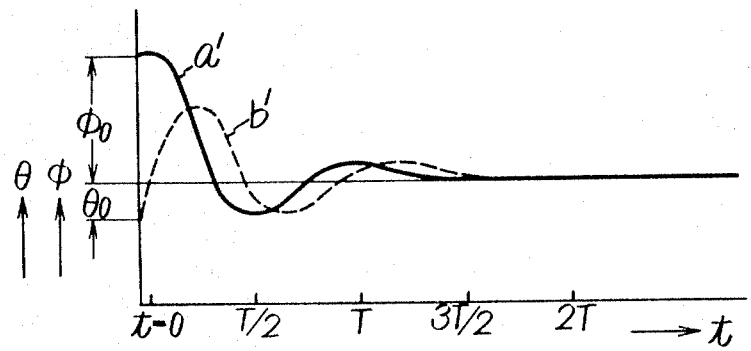
FIGURE 4 is a graph, similar to FIGURE 1, for explaining the north-seeking action of a gyrocompass of the present invention.

In FIGURE 3, 5 indicates a gyro case enclosing a gyro, and a gyro-spin axis is on the line A–B. 6 is a ballistic consisting of a pair of pots 7 and 8 and an interconnecting pipe 10, in which a liquid 9 is enclosed. The ballistic 6 and the gyro case 5 move as one body about a shaft 11 crossing the line A–B at the right angle as in compasses heretofore employed. Where the integral torque generator U described in FIGURE 2 is attached to the gyro case 5 in parallel to the line A–B as illustrated in FIGURE 3, transfer of the center of gravity of the integral torque generator U acts on the gyro as a torque about the horizontal shaft 11. Even if the torque has reached a maximum value when the bubble 3 stays at the one end of the vessel, so far as the viscosity of the liquid 2 is so selected that the torque is sufficiently smaller than that produced by the ballistic 6 and that the moving speed of the bubble 3 is sufficiently small as compared with that of the liquid in the ballistic 6, the spin axis of this gyro moves to rest toward substantially the north as shown by the curve in FIGURE 1 owing to the action of the ballistic 6 and a damping device not shown. In the Northern Hemisphere, however, the spin axis A–B cannot rest unless it inclines with its north side a little higher. Accordingly, when the gyro-spin axis is about to rest substantially toward the north the spin axis always comes to be in a condition that its north side is higher than the south side. That is, since the spin axis moves in the same manner as the curve in FIGURE 1, when the motion draws to a standstill the bubble 3 gradually and accurately moves on toward the north side and transfer of the center of gravity of the integral torque generator U produces a torque which gradually pushes down the south side toward the direction of gravity. Thus the gyro comes down to the north and continues the north-seeking action so that the torque of the integral torque generator U may be eliminated by a torque produced by the ballistic 6. Thus, a stable stationary point of this gyro is inevitably determined in the following manner. That is, the stable point is such that the torque of the integral torque generator U is constant and a difference between this torque and that of the ballistic 6 remains as a constant torque around the horizontal shaft 11 and precession caused by the resultant torque coincides with the rotary component around the vertical axis of the surface of the earth at the place where the gyro is located. In other words, the position that the torque of the integral torque generator U becomes constant is a position that the spin axis stays horizontal. In such a case, the liquid of the ballistic 6 is kept in an equilibrium in the pots 7 and 8 and a torque of the ballistic 6 is zero. The bubble 3 of the integral torque generator U stands still at a place on the north side and a torque around the horizontal shaft due to transfer of the center of gravity becomes a value corresponding to precession around the vertical axis of the gyro which is equal to the vertical component of rotation of the earth at that place. Thus, by the use of the integral torque generator U the stationary point of the gyro-spin axis is correctly horizontal, so that the torque around the vertical axis produced by the damping system is also zero at the stationary point and therefore no latitudinal errors are produced. That is, the north-seeking action of the gyrocompass using an integral torque generator which corresponds to that in FIGURE 1 is as illustrated by the curves a′ and b′ in FIGURE 4 corresponding to those in FIGURE 1.

Figure 5:
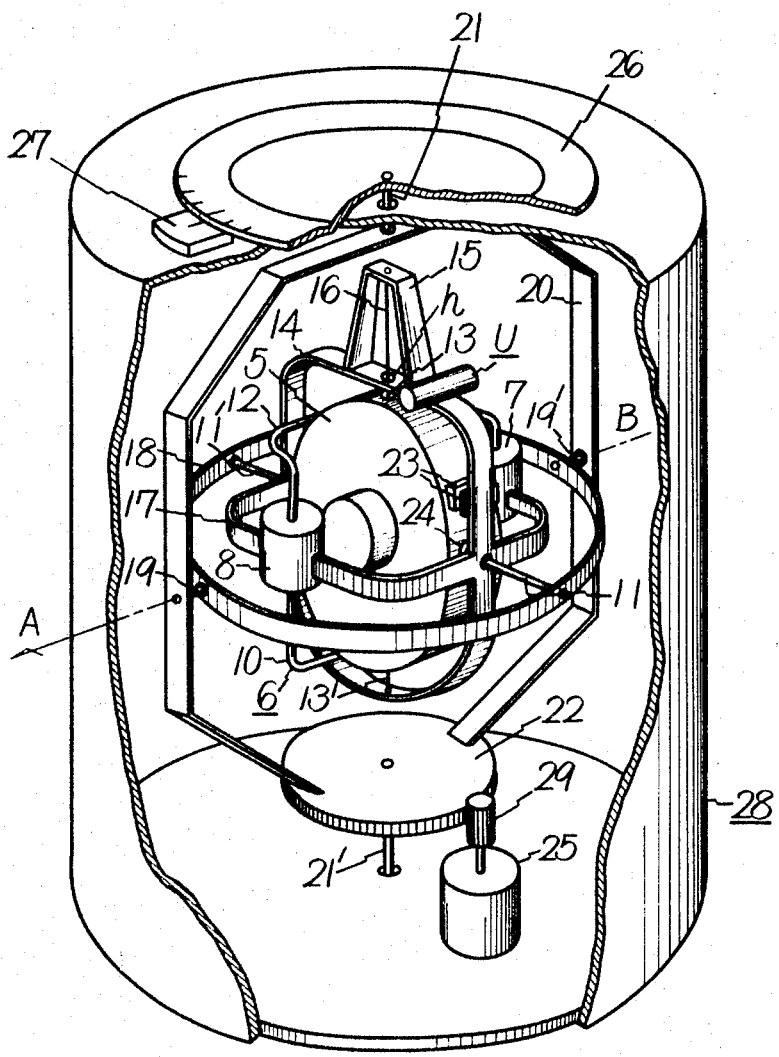
FIGURE 5 is a perspective view schematically illustrating an embodiment of the gyrocompass of the present invention, having one portion removed.

FIGURE 5 illustrates an embodiment of the present invention, which is shown simple in structure for explaining the principle of this invention. A gyro case 5 similar to that in FIGURE 3 has vertical shafts 13 and 13′, which are supported to a vertical ring 14 by means of ball bearings not shown in the figure. The vertical ring 14 is in turn supported to a horizontal ring 18 by horizontal shafts 11 and 11′ through ball bearings not shown. Furthermore, the horizontal ring 18 is supported to a follower ring 20 by shafts 19 and 19′ through ball bearings not shown. This follower ring 20 is supported to a case 28 by shafts 21 and 21′. The vertical ring 14 has a support base 15, from which the vertical shaft 13 is suspended by a suspension wire 16, so that the weight of the gyro case 5 does not render any load to the vertical shaft bearings. To the vertical ring 14, a ballistic 6 including pots 7 and 8 and a communication pipe 10 such as illustrated in FIGURE 3 is fixed by a support arm 17. The pots 7 and 8 have an air pipe 12 and a non-contact pick-off 23 is provided between the vertical ring 14 and the gyro case 5 to detect relative displacement between the ring 14 and the case 5, forming a servo-loop through an amplifier (not shown), a servo-motor 25, toothed wheels 29 and 22 and through the follower ring 20 and the horizontal ring 18 connected to the toothed wheel 22. As a result of this, the gyro case 5 and the vertical ring 14 are always in motion together and controlled by the servo-system so that no displacement may be caused therebetween. Thus, the azimuth of the spin axis can be read out from a dial card 26 attached to the shaft 21 with respect to an index 27.

In this case, the gyro case 5 and the ballistic 6 are put in the same state ground the horizontal shaft 11 as in FIGURE 3. A damping system is formed by a counter-weight 24. That is, the counter-weight 24 is mounted on the west side of the gyro case 5 and produces a torque around the vertical shafts 13 and 13′ in proportion of inclination of the gyro case, which acts as a damping action as has been well known. In FIGURE 5, the gyro faces toward the south and rotates in the clockwise direction.

The above is, by way of example, the structure of the gyrocompass to which the present invention is applied. Furthermore, in FIGURE 5 an integral torque generator U such as described in FIGURE 2 is mounted on the vertical ring 14 in parallel to the gyro-spin axis. That is, since the integral torque generator U can move about the horizontal shafts 11 and 11' integrally with the ballastic 6 and the gyro case 5 exactly in the same manner as that previously described in connection with FIGURE 3, it will be seen that the gyrocompass in FIGURE 5 comes to a standstill horizontally toward the due north as explained in FIGURE 3. Even if the integral torque generator U is mounted directly on the gyro case 5 in the example shown in FIGURE 5, its action is exactly the same. In accordance with the kind of a damping system used, the integral torque generator U can be mounted on the gyro case 5 or a portion which support it and moves about the same horizontal shaft as one body with the gyro case and the ballistic.

Many other kinds of integral torque generators may be used without being limited to that shown in FIGURE 2. Several examples of the integral torque generator will hereinbelow be explained which are different from that in FIGURE 2.

Figure 6:
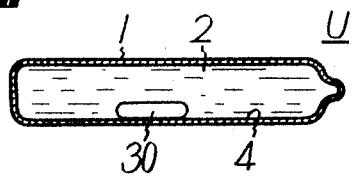
FIGURES 6 and 7 are schematic diagrams showing other integral torque generators according to the present invention.

FIGURE 6 illustrates an integral torque generator U which is different from that shown in FIGURE 2 and its vessel and viscous liquid contained therein are the same as those in FIGURE 2 and therefore marked with the same reference numerals, but mercury indicated at 30 is enclosed in the vessel 1 instead of the bubble 3 in FIGURE 2. Its specific gravity is larger than the viscous liquid 2 and goes down under the viscous liquid 2 and coheres due to its surface tension as illustrated in the figure. In this case, the inner surface 4 of the vessel 1 with which the mercury 30 gets in touch is the same as that in FIGURE 2. Also in the example shown in FIGURE 6, when the surface 4 inclines the mercury 30 moves on to a lower end of the vessel 1 and its speed is determined in accordance with the viscosity of the liquid 2 and inclination of the vessel 1. The center of gravity of the whole unit varies in proportion to an integrated value of the inclination with respect to time and this integral torque generator can be used as an integral torque generator U having the same effect as that described above in connection with FIGURE 2. It will be understood that generally a liquid material having large surface tension and larger specific gravity than that of the viscous liquid 2 can be used instead of the mercury ball.

Figure 7:
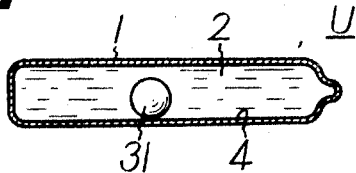

FIGURE 7 is another integral torque generator which is different in structure from the above one, and a solid ball 31 is enclosed in a vessel 1 filled with a highly viscous liquid 2 instead of the mercury 30 in FIGURE 6, the specific gravity of the solid ball 31 being larger than that of the viscous liquid 2. When the inner surface 4 inclines the solid ball 31 also moves on to a lower end of the vessel 1 at a speed proportionate to the inclination.

Since the integral torque generator U shown in FIGURE 2 makes use of the bubble 3, it is extremely precise in operation but it is not so suitable for obtaining a large torque. In the integral torque generators U illustrated in FIGURES 6 and 7 their moving members are of large specific gravity, so that resultant torque is far larger than that by the generator U in FIGURE 2, even if the vessel is relatively small.

According to the present invention, a device in which the device itself causes transfer of the center of gravity in proportion to an integrated value of inclination is attached to a sensitive element of a gyrocompass whereby no latitudinal errors are caused and gyrocompasses of high precision can be manufactured at a low price. Consequently the present invention is very valuable for practical use in the operation of ships.

The gyrocompasses to which this invention can be applied are well-known ones of the same kind without being restricted to that shown in FIGURE 5. As the ballistic, not only mercury and liquid type ones but also the so-called top-heavy type ones using viscosity and a pendulum can be employed.

The damping device of this invention can also be applied not only to the damping weight system shown in FIGURE 5 but also to an easterly eccentric pivot system, an air control system or the like such that a torque is applied to the vertical shaft to effect damping. The gyro supporting system can also be applied to other ones. Since these well-known gyrocompasses are not related directly to the present invention, explanations thereon are omitted from the specification. However, it will be seen that so far as this invention can be applied to them, they fall within the scope of the present invention.

It will be apparent that many modifications and variations may be effected without departing from the scope of the novel concept of this invention.

I claim as my invention:

1. A gyrocompass comprising a case, a rotor mounted in said case for rotating about a first horizontal axis, a support member including means connected to said case and providing an axis of rotation of said case and said rotor mounted therein along a second horizontal axis which is perpendicular to said first horizontal axis, said case having a vertical axis passing therethrough and intersecting said first and second horizontal axes at right angles thereto, and an integral torque generator secured to said means, said integral torque generator and said means being moved with said case and said rotor about said second axis to produce a torque with respect to time to eliminate the effects of latitudinal error which is caused by the earth rotation, said integral torque generator including a cylindrical sealed vessel, a viscous liquid sealed within said cylindrical sealed vessel and a material the specific gravity of which differs from that of said viscous liquid, which is not diffused into said viscous liquid and positioned within said cylindrical sealed vessel and movable in said viscous liquid.

2. A gyrocompass comprising a case, a rotor mounted in said case for rotating about a first horizontal axis, a support member including means connected to said case and providing an axis of rotation of said case and said rotor mounted therein along a second horizontal axis which is perpendicular to said first horizontal axis, said case having a vertical axis passing therethrough and intersecting said first and second horizontal axes at right angles thereto, and an integral torque generator secured to said means, said integral torque generator and said means being moved with said case and said rotor about said second axis to produce a torque with respect to time to eliminate the effects of latitudinal error which is caused by the earth rotation, said integral torque generator including a cylindrical sealed vessel, a viscous liquid sealed within said cylindrical sealed vessel and a bubble formed in said cylindrical sealed vessel, said bubble being movable in contact with the upper surface of said cylindrical sealed vessel.

3. A gyrocompass comprising a case, a rotor mounted in said case for rotating about a first horizontal axis, a support member including means connected to said case and providing an axis of rotation of said case and said rotor mounted therein along a second horizontal axis which is perpendicular to said first horizontal axis, said case having a vertical axis passing therethrough and intersecting said first and second horizontal axes at right angles thereto, and an integral torque generator secured to said means, said integral torque generator and said means being moved with said case and said rotor about said second axis to produce a torque with respect to time to eliminate the effects of latitudinal error which is caused by the earth rotation, said integral torque generator including a cylindrical sealed vessel, a viscous liquid sealed within said cylindrical sealed vessel and a liquidus material enclosed in said cylindrical sealed vessel, both the surface tension and the specific gravity of said liquidus material being larger than those of said viscous liquid.

4. A gyrocompass comprising a case, a rotor mounted in said case for rotating about a first horizontal axis, a support member including means connected to said case and providing an axis of rotation of said case and said rotor mounted therein along a second horizontal axis which is perpendicular to said first horizontal axis, said case having a vertical axis passing therethrough and intersecting said first and second horizontal axes at right angles thereto, and an integral torque generator secured to said means, said integral torque generator and said means being moved with said case and said rotor about said second axis to produce a torque with respect to time to eliminate the effects of latitudinal error which is caused by the earth rotation, said integral torque generator including a cylindrical sealed vessel, a viscous liquid sealed within said cylindrical sealed vessel and a solid body enclosed in said cylindrical sealed vessel in contact with said viscous liquid, the specific gravity of said solid body being larger than that of said viscous liquid.

References Cited

UNITED STATES PATENTS

| | | |
|---|---|---|
| 1,777,958 | 10/1930 | Brown. |
| 1,805,854 | 5/1931 | Sperry. |
| 1,866,706 | 7/1932 | Henderson. |
| 1,923,885 | 8/1933 | Rawlings. |
| 2,249,345 | 7/1941 | Braddon. |
| 3,212,196 | 10/1965 | Carter. |

WILLIAM D. MARTIN, JR., Primary Examiner

U.S. Cl. X.R.

33—204